US012759875B2

(12) United States Patent
Lacheen et al.

(10) Patent No.: US 12,759,875 B2
(45) Date of Patent: Oct. 13, 2026

(54) METHOD FOR PRODUCING LIQUEFIED CARBON DIOXIDE FROM LIQUEFIED NATURAL GAS

(71) Applicant: Chevron U.S.A. Inc., San Ramon, CA (US)

(72) Inventors: Howard Steven Lacheen, Richmond, CA (US); Christopher Declan Lane, Kensington, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 528 days.

(21) Appl. No.: 18/234,017

(22) Filed: Aug. 15, 2023

(65) Prior Publication Data

US 2025/0059035 A1 Feb. 20, 2025

(51) Int. Cl.

| | |
|---|---|
| ***C01B 32/50*** | (2017.01) |
| ***B01D 53/047*** | (2006.01) |
| ***B01J 19/00*** | (2006.01) |
| ***B01J 19/24*** | (2006.01) |
| ***C01B 3/48*** | (2006.01) |
| ***C01B 3/56*** | (2006.01) |

(Continued)

(52) U.S. Cl.

CPC .............. *C01B 3/48* (2013.01); *B01D 53/047* (2013.01); *B01J 19/0013* (2013.01); *B01J 19/245* (2013.01); *C01B 3/56* (2013.01); *C01B 32/50* (2017.08); *F25J 1/0012* (2013.01); *F25J 1/0082* (2013.01); *F25J 1/0229* (2013.01); *B01D 2256/22* (2013.01); *B01D 2257/108* (2013.01); *B01D 2257/7025* (2013.01); *B01J 2219/00103* (2013.01); *C01B 2203/0233* (2013.01); *C01B 2203/0238* (2013.01); *C01B 2203/0283* (2013.01); *C01B 2203/042* (2013.01); *C01B 2203/0475* (2013.01); *C01B 2203/048* (2013.01); *C01B 2203/0883* (2013.01); *F25J 2205/60* (2013.01)

(58) Field of Classification Search

None

See application file for complete search history.

(56) References Cited

U.S. PATENT DOCUMENTS

| | | | | |
|---|---|---|---|---|
| 2022/0325950 | A1 | 10/2022 | Ko et al. | |
| 2022/0331768 | A1 | 10/2022 | Ko et al. | |
| 2023/0159330 | A1 * | 5/2023 | Kemp ..................... | C01B 3/382 252/373 |

FOREIGN PATENT DOCUMENTS

| | | | |
|---|---|---|---|
| CN | 112875644 | * | 6/2021 |
| CN | 112875644 | A | 6/2021 |
| WO | WO2013141454 | * | 9/2013 |

OTHER PUBLICATIONS

PCT/US2024/038372, International Search Report, Nov. 4, 2024, 13 pages.

* cited by examiner

*Primary Examiner* — Sheng H Davis

(74) *Attorney, Agent, or Firm* — Michael E. Carmen; Terrence M. Flaherty

(57) ABSTRACT

A method for converting carbon dioxide gas to liquefied carbon dioxide includes (a) receiving, in a heat exchanger, a carbon dioxide gas stream and a liquefied natural gas stream, and (b) exposing the carbon dioxide gas stream to the liquefied natural gas stream to convert the carbon dioxide gas stream to liquefied carbon dioxide, and the liquefied natural gas stream is regasified to natural gas. The natural gas exits the heat exchanger and is sent to a steam methane reformer for further processing.

21 Claims, 5 Drawing Sheets

(51) Int. Cl.

| | |
|---|---|
| ***F25J 1/00*** | (2006.01) |
| ***F25J 1/02*** | (2006.01) |

METHOD FOR PRODUCING LIQUEFIED CARBON DIOXIDE FROM LIQUEFIED NATURAL GAS

BACKGROUND

Natural gas (NG) occurs underground and is present as a gas when it comes out of the ground. Natural gas primarily consists of methane ($CH_4$), and additionally some flammable compounds such as ethane ($C_2H_6$) and propane ($C_3H_8$). Liquefied natural gas (LNG) refers to natural gas artificially liquefied at low temperatures of about −160° C.

Natural gas is extracted from oilfields or gas fields. For facilitating the extraction of natural gas from oilfields or gas fields, fracturing fluid such as steam, groundwater, seawater, and carbon dioxide is injected into a well bore. The natural gas extracted from an oil or gas field is delivered as liquefied natural gas to consumers.

Liquefied natural gas delivered to consumers needs to be regasified for use in consumer places or for distribution. One way to regasify liquefied natural gas is the use of seawater. However, the use of seawater for liquefied natural gas regasification could have an unexpected impact on marine ecosystems. Alternatively, for liquefied natural gas regasification, natural gas may be burned to generate heat which is used as energy for liquefied natural gas regasification. This method has a disadvantage of energy waste. The flue gas discharged from a thermal power station can contain carbon dioxide, which is a serious environmental problem, such that reduced emission levels are highly desirable.

SUMMARY

In accordance with an illustrative embodiment, a method for converting carbon dioxide gas to liquefied carbon dioxide comprises:

(a) receiving, in a heat exchanger, a carbon dioxide gas stream and a liquefied natural gas stream, and (b) exposing the carbon dioxide gas stream to the liquefied natural gas stream to convert the carbon dioxide gas stream to liquefied carbon dioxide.

In accordance with another illustrative embodiment, a method for converting carbon dioxide gas to liquefied carbon dioxide comprises:

(a) introducing a liquefied natural gas stream to a pump to generate a pressurized liquefied natural gas stream;

(b) introducing a carbon dioxide gas stream and the pressurized liquefied natural gas stream to a heat exchanger; and (c) exposing the carbon dioxide gas stream to the pressurized liquefied natural gas stream to convert the carbon dioxide gas stream to liquefied carbon dioxide.

In accordance with yet another illustrative embodiment, a system comprises:

a heat exchanger configured to cool carbon dioxide gas with liquefied natural gas and convert the carbon dioxide gas to liquefied carbon dioxide and regasify the liquefied natural gas to natural gas.

BRIEF DESCRIPTION OF THE DRAWINGS

In combination with the accompanying drawing and with reference to the following detailed description, the features, advantages, and other aspects of the implementations of the present disclosure will become more apparent, and several implementations of the present disclosure are illustrated herein by way of example but not limitation. In the accompanying drawings.

DETAILED DESCRIPTION

Figure 1:
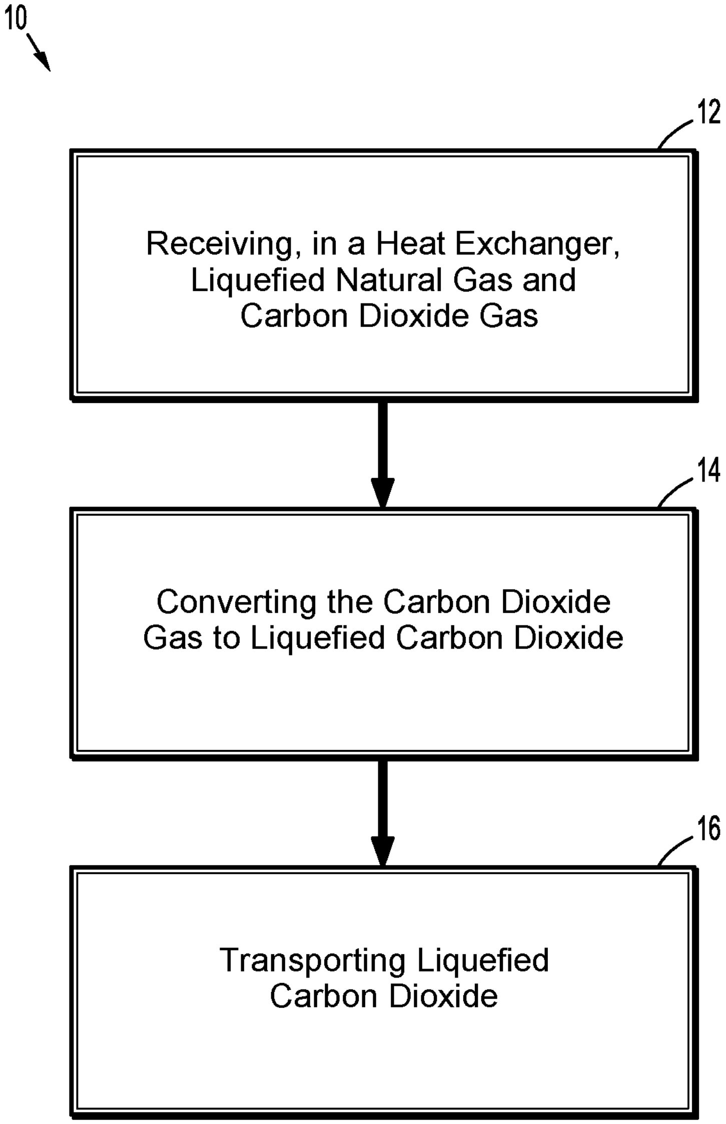
FIG. 1 is a flow chart illustrating a method and system for converting carbon dioxide gas to liquefied carbon dioxide utilizing liquefied natural gas, according to an illustrative embodiment.

Various illustrative embodiments described herein include utilizing liquefied natural gas in the production of liquefied carbon dioxide and hydrogen.

As mentioned above, natural gas primarily consists of methane, and additionally some flammable compounds such as ethane and propane. Natural gas also contains numerous minor components such as, for example, water, hydrogen sulfide, carbon dioxide, mercury, nitrogen, oxygen and light hydrocarbons typically having two to six carbon atoms. A few of these components, such as water, hydrogen sulfide, carbon dioxide, and mercury, are contaminants which are harmful to downstream steps such as natural gas processing or the production of liquefied natural gas. One of the key steps in producing liquefied natural gas is therefore the processing of natural gas upstream to remove the minor components such as $CO_2$, $H_2S$, $H_2O$, Hg and aromatics (benzene, toluene, xylene) to ppm levels prior to gas liquefaction. Ports that receive liquefied natural gas typically re-gasify the liquefied natural gas using seawater as a thermal reservoir, which converts liquefied natural gas to natural gas.

A large-scale hydrogen market would involve the processing of natural gas where it is found and then delivering hydrogen over long distances. While the use of pipelines may be economic for shipping over relatively short distances or intercontinental, shipping over long distances will be more challenging because hydrogen has a low density both in gaseous and liquid form. In addition, the liquefaction of hydrogen requires significant energy to cool to around 20 K. Alternatives for shipping hydrogen include using a liquid-based carrier, or LOHC, such as an organic molecule that stores hydrogen and is then dehydrogenated at the delivery location. Other alternatives that have been proposed include the use of ammonia and methanol as these are produced by very carbon intensive processes and their application as fuel are also early in development.

An alternative to shipping hydrogen is to instead ship liquefied natural gas to a desired location and then produce hydrogen at the delivery site for use in either industrial or transportation settings. The process for producing hydrogen from the liquefied natural gas would also produce carbon dioxide gas that can be captured. However, the delivery location for storing the carbon dioxide gas may have limited sequestration capacity. For example, Australia has large reserves of natural gas and geological storage potential, whereas Japan has a much smaller capacity for carbon dioxide storage. Thus, for a country such as Japan, carbon dioxide gas would have to be shipped to a location that has a sufficiently large sequestration capacity. The carbon dioxide can also be transported as a liquid, which is a commercially proven practice today at a limited scale for the beverage industry. One challenge at a large scale would be the liquefaction system capex and energy, estimated at about 6 kWh/kg, for the process.

In view of this, the illustrative embodiments described herein overcome these and other drawbacks by providing a solution for converting carbon dioxide gas to liquefied carbon dioxide utilizing liquefied natural gas. In particular, there is a large reserve of "cold energy" in the liquefied natural gas at around 112 K as compared to the cold energy of liquefied carbon dioxide which is around 217 K, i.e., the liquefied natural gas has a significantly lower temperature than liquefied carbon dioxide. The illustrative embodiments described herein therefore use the liquefied natural gas as a coolant in, for example, a carbon dioxide liquefaction plant. By implementing the above solution, the liquefaction plant capex can be significantly lowered resulting in a decrease in the size of the regasification plant.

The illustrative embodiments of the present disclosure will be specifically described below with reference to the accompanying drawings. For the purpose of clarity, some steps leading up to the production of the liquefied carbon dioxide as illustrated in FIGS. 1-5 are omitted. In other words, one or more well-known processing steps which are not illustrated but are well-known to those of ordinary skill in the art have not been included in the figures. This is not intended to be interpreted as a limitation of any particular embodiment, or illustration, or scope of the claims.

FIG. 1 illustrates a flow chart of method 10 for converting carbon dioxide gas to liquefied carbon dioxide according to embodiments of the present disclosure. Method 10 for converting carbon dioxide gas to liquefied carbon dioxide according to the illustrative embodiments of the present disclosure will now be described with reference to FIG. 2 in combination with FIG. 1. For ease of understanding, specific examples mentioned in the following description are all illustrative and are not used to limit the protection scope of the present disclosure.

Figure 2:
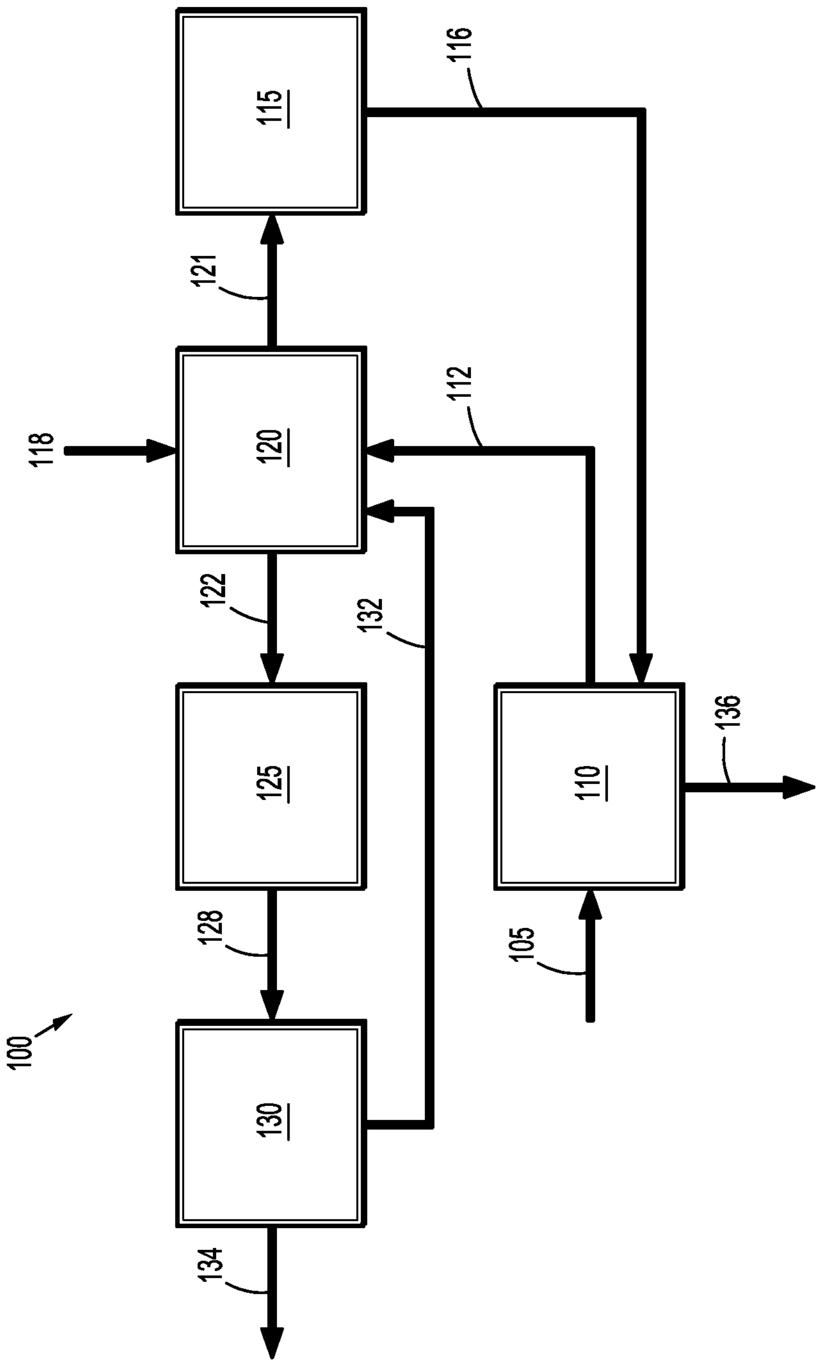
FIG. 2 illustrates a process and system for converting carbon dioxide gas to liquefied carbon dioxide utilizing liquefied natural gas, according to an illustrative embodiment.

In addition, the method and system described herein can be implemented using the system 100 of FIG. 2. The system 100 includes a heat exchanger 110, an absorption unit 115, a steam methane reformer (SMR) 120, a water-gas shift unit 125 and a pressure swing absorption (PSA) unit 130. As will be appreciated by one of skill in the art, components of the liquefied carbon dioxide production system can be in fluid communication with each other through any suitable conduits (e.g., pipes, streams, etc.).

At step 12, heat exchanger 110 of system 100, e.g., a liquefaction plant, receives stream 105 of liquefied natural gas, and stream 116 of carbon dioxide gas. In an illustrative embodiment, the stream 105 of liquefied natural gas is received from an off-shore facility where natural gas has been converted to the liquefied natural gas. For example, a liquefied natural gas production facility receives raw feed gas, such as natural gas, from a pipeline (e.g., a natural gas pipeline) where it is then subjected to known processing conditions to convert natural gas to liquefied natural gas. The liquefied natural gas is then sent to a liquefied natural gas storage unit such as one or more storage tanks, such as double walled tanks, which are transportable. The liquefied natural gas can then be pumped out of the liquefied natural gas storage tanks and loaded into liquefied natural gas vessels via one or more pipelines. In an embodiment, a liquefied natural gas vessel is a seafaring ship with marine liquefied natural gas storage tanks.

In an illustrative embodiment, the stream 105 of liquefied natural gas supplied to the heat exchanger 110 may have a temperature ranging from about −50° C. to about −200° C. and a pressure of about 0.05 to about 18 bar. In an illustrative embodiment, the heat exchanger 110 also receives stream 116 of carbon dioxide gas from, for example, absorption unit 115 of system 100 as discussed below. The stream 116 of carbon dioxide gas supplied to the heat exchanger 110 may have a temperature ranging from about 5° C. to about 100° C. and a pressure of about 1 to about 30 bar. In one illustrative embodiment, the stream 105 of liquefied natural gas supplied to the heat exchanger 110 is at a first temperature and the stream 116 of carbon dioxide gas supplied to the heat exchanger 110 is at a second temperature higher than the first temperature.

At step 14, the stream 116 of carbon dioxide gas is converted to stream 136 of liquefied carbon dioxide in heat exchanger 110. As one skilled in the art will readily appreciate, the stream 116 of carbon dioxide gas is not liquefied when it is in a normal-temperature and normal-pressure state. For this reason, the stream 116 of carbon dioxide gas is supplied to heat exchanger 110 where it is exposed to the stream 105 of liquefied natural gas having a temperature lower than the temperature of the stream 116 of carbon dioxide gas. Accordingly, the temperature of the stream 105 of liquefied natural gas serves as a coolant which thereby exchanges temperatures with the stream 116 of carbon dioxide gas in the heat exchanger 110 to convert the stream 116 of carbon dioxide gas to stream 136 of liquefied carbon dioxide and the stream 105 of liquefied natural gas to stream 112 of natural gas. In particular, not only is the stream 105 of liquefied natural gas at a sufficiently low temperature and has sufficient refrigeration capacity to pre-cool the stream 116 of carbon dioxide gas, but also the heat of the stream 116 of carbon dioxide gas by indirect heat exchange converts the stream 105 of liquefied natural gas to stream 112 of natural gas as discussed below.

In illustrative embodiments, the stream 105 of liquefied natural gas is heated in heat exchanger 110 from the temperature of the stream 116 of carbon dioxide gas which exchanges temperatures with the stream 105 of liquefied natural gas in the heat exchanger 110 to convert the stream 105 of liquefied natural gas to stream 112 of natural gas. The stream 112 of natural gas exits heat exchanger 110 and is sent to steam methane reformer 120 for further processing.

In aspects, the natural gas in stream 112 can include methane and one or more of $C_2$+ hydrocarbons (e.g., ethane, propane, butanes, pentanes, or combinations thereof), nitrogen, carbon dioxide, and contaminants (e.g., sulfur-containing compounds, chlorides, water vapor, or combinations thereof). It is contemplated that the natural gas in stream 112 of natural gas can be pre-treated to remove sulfur-containing compounds (e.g., hydrogen sulfide, carbon sulfide, carbonyl sulfide, carbon disulfide, organic sulfur compounds, or combinations thereof) to a level acceptable to avoid poisoning of the catalyst in the steam methane reformer 120. In aspects, the concentration of contaminants in stream 112 of natural gas is less than about 1 part per million volume (ppmv), or less than about 0.5 ppmv, or less than about 0.1 ppmv.

In non-limiting illustrative embodiments, system 100 further includes steam methane reformer 120 to process stream 112 of natural gas. In an illustrative embodiment, steam can be introduced into the steam methane reformer 120 via stream 118. In an embodiment, a molar ratio of steam to methane in the total feed streams to the steam methane reformer 120 can be from about 0.5:1 to about 4.0:1, alternatively from about 0.75:1 to about 3.0:1, or alternatively from about 0.8:1 to about 2.5:1.

The steam methane reformer 120 can include one or more vessels containing a catalyst. The steam methane reformer 120 can generally include a reaction side and a heating side, wherein heat derived from combustion of a fuel on the heating side is used to supply heat on the reaction side where the methane reforming reaction occurs. For example, a vessel for the steam methane reformer 120 can contain one or more tubes loaded with catalyst, where the interior of the tubes is the reaction side of the steam methane reformer 120, and each tube is fluidly connected with streams 112, 118 and 132; while the outer surface of the tubes is considered to be on the heating side of the steam methane reformer 120 and is subjected to heat generated from combustion of a fuel received as stream 132 that is fed to and combusted on the heating side of the steam methane reformer 120.

The steam methane reformer 120 is configured to contact the feed natural gas received via stream 112 with a catalyst to produce syngas (e.g., on the reforming reaction side of the steam methane reformer 120). In embodiments, the catalyst of the steam methane reformer 120 can include any conventional steam methane reformed catalyst such as, for example, a nickel-based catalyst (e.g., sulfur sensitive nickel-based catalyst) or a sulfur passivated nickel-based catalyst. Methane can be reformed (e.g., converted to syngas) in the presence of water (e.g., steam) according to the general reaction $CH_4+H_2O \leftrightarrows CO+3H_2$. The CO made in the reaction can also be converted to $CO_2$ in the steam methane reformer 120, by the reaction in the presence of water (e.g., steam) according to the general reaction $CO+H_2O \leftrightarrows CO_2+H_2$.

In illustrative embodiments, the steam methane reformer 120 can comprise any suitable reactor such as, for example, a tubular reactor, a multitubular reactor, and the like, or combinations thereof. In an embodiment, the steam methane reformer 120 can comprise one or more catalyst filled tubes (e.g., nickel-based catalyst filled tubes). In an embodiment, methane reforming can take place in catalyst filled tubes (e.g., nickel-based catalyst filled tubes). In such an embodiment, the catalyst filled tubes can be heated indirectly, such as for example by burning a steam methane reformer fuel inside a reactor (e.g., fire box, furnace, etc.) comprising the catalyst filled tubes (e.g., a tube-filled furnace).

In embodiments, the fuel for combusting in the steam methane reformer 120 can be the tail gas received from the pressure swing absorption unit 130 via stream 132, as discussed below. When embodied as the tail gas from the pressure swing absorption unit 130, the steam methane reformer fuel can include at least carbon dioxide and methane. In additional or alternative aspects, the stream 132 of the pressure swing absorption unit 130 is the only fuel stream that is fed to the steam methane reformer 120 during steady state operation. In an embodiment, a combusted tail gas stream 121 including carbon dioxide is emitted from steam methane reformer 120 to absorption unit 115 for capturing the carbon dioxide as discussed below.

Methane reforming (according to the general reaction $CH_4+H_2O \leftrightarrows CO+3H_2$) is strongly endothermic, and a reaction rate depends on the temperature, pressure and catalyst type. Methane will undergo the reforming reaction at high temperatures; however, in the presence of a catalyst (e.g., nickel-based catalyst), the temperature at which methane can be reformed can be lowered. In non-limiting embodiments, the reaction can be carried out at a temperature ranging from about 600 to about 1000° C. As such, steam methane reformer 120 converts stream 112 of natural gas to hydrogen by reacting stream 118 with stream 112 of natural gas to generate a stream 122 of hydrogen, carbon monoxide, water and methane. In an embodiment, a combusted tail gas stream 121 including carbon dioxide is emitted from steam methane reformer 120 to absorption unit 115 for capturing the carbon dioxide.

In non-limiting illustrative embodiments, system 100 further includes absorption unit 115 to process the combusted tail gas stream 121. In an embodiment, the absorption unit 115 further includes an absorber and regenerator, where at least a portion of the carbon dioxide can be removed (e.g., recovered, separated, etc.) from at least a portion of the combusted tail gas stream 121 by a physical solvent or a chemical solvent in the absorber. Suitable physical solvents useful in the absorption unit 115 include, for example, methanol, propylene carbonate, N-methylpyrrolidone, a glycol ether, ethers of polyglycols (e.g., dimethoxytetraethylene glycol or N-substituted morpholine), or a combination thereof. Suitable chemical solvents useful in the absorption unit 115 include, for example, primary amines, secondary amines, tertiary amines, sterically hindered amines, methylethylamine (MEA), methyl diethanolamine (MDEA), diglycolamine (DGA), 2-amino-2-methyl-1-propanol (AMP), or a combination thereof.

The chemical solvent or physical solvent absorbs the carbon dioxide through the absorption unit 115 to form liquefied carbon dioxide stream (i.e., a carbon dioxide enriched solvent stream), while the remaining components of the combusted tail gas stream 121, i.e., a carbon dioxide depleted stream exits the absorption unit 115 (not shown). The carbon dioxide in the liquefied carbon dioxide stream leaves the absorber and is fed to the regenerator, where the carbon dioxide is separated from the solvent (the solvent is regenerated) to produce a lean solvent (e.g., a lean physical solvent or a lean chemical solvent) and a carbon dioxide product. The lean solvent can be recycled to the absorber, and the carbon dioxide product is further processed such as by drying or dehydration and a carbon dioxide gas is recovered as stream 116. Stream 116 of carbon dioxide gas exits absorption unit 115 and is supplied to the heat exchanger 110 having a temperature ranging from about 5° C. to about 100° C. and a pressure of about 1 to about 30 bar as discussed above.

In an embodiment, the absorption unit 115 can include any suitable absorber column, wherein a gas phase (e.g., the combusted tail gas stream 121) interacts with a liquid phase (e.g., absorption solvent) via co-current flow, counter-current flow, or cross-flow. Generally, absorption columns can be vertical and cylindrical columns or towers. In an embodiment, the absorber can comprise a countercurrent absorber column, wherein the combusted tail gas stream 121 can be introduced to the column countercurrent (e.g., opposing flow directions) with respect to the flow of absorption solvent.

In an embodiment, the absorption solvent can be introduced as a downflow at the top of the absorber, and the combusted tail gas stream 121 can be introduced (e.g., bubbled) at the bottom of the absorber. In such an embodiment, the carbon dioxide depleted from the combusted tail gas stream can be recovered at the top of the absorber, and the carbon dioxide enriched solvent can be recovered at the bottom of the absorber. The absorber can have one or more trays and/or packing as a contacting device. However, any other suitable contacting devices can be employed, such as for example static or dynamic mixers, spargers, impellers, etc. In some embodiments, the absorber can comprise a packed bed column, a tray column, a spray column, a falling film column, a bubble column, a sparged tank column, and the like, or combinations thereof. In an embodiment, the absorber can operate at a suitable pressure, e.g., a pressure of from about 375 psig to about 575 psig.

In the case where the absorption solvent is a physical solvent, the regenerator can be embodied as a flash tank or flash column configured to remove the carbon dioxide from the liquefied carbon dioxide stream by pressure reduction, i.e., flashing (e.g., via pressure reduction) the carbon dioxide out of the physical solvent. In embodiments, the flash tank can comprise any suitable vessel, wherein a gas phase (e.g., the carbon dioxide) is flashed by differential pressure from the liquid phase (e.g., the liquefied carbon dioxide stream). Generally, the flash tank can be any vessel configured to subject the liquefied carbon dioxide stream to a drop in pressure such that the carbon dioxide is liberated from the liquid solvent to form the lean physical solvent. A pressure in the flash tank is generally lower than a pressure in the absorber to enable the carbon dioxide to flash from the liquefied carbon dioxide stream to produce the lean physical solvent and the carbon dioxide product. The carbon dioxide product can then be dehydrated or dried to obtain a carbon dioxide gas as stream 116. In an embodiment, the flash tank can operate at a pressure in a range of from a vacuum pressure to about 200 psig (1.38 MPag). In some embodiments, the flash tank is one or more vessels (e.g., more than one flash tank) connected in series such that the reduction in pressure is accomplished in stages.

In the case where the absorption solvent is a chemical solvent, the regenerator can be embodied as a stripper configured to use a stripping gas to remove the carbon dioxide from the chemical solvent. The stripper can include a reboiler that provides heat to the stripper for removing carbon dioxide from the chemical solvent to produce the lean chemical solvent and the carbon dioxide gas as stream 116. In aspects, the stripper can comprise any suitable stripping column, wherein a gas phase (e.g., the carbon dioxide) is removed from the liquid phase (e.g., the $CO_2$ enriched solvent). Generally, the stripper can be similar in configuration to the absorber, while operating at different parameters (e.g., pressure, temperature, etc.). A pressure in the stripper can be lower than a pressure in the absorber and a temperature in the stripper can be higher than a temperature in the absorber, to enable the liquefied carbon dioxide stream to release carbon dioxide. Generally, the stripper can be one or more vertical and cylindrical columns or towers.

In an embodiment, the liquefied carbon dioxide stream can be introduced as a downflow at the top of the stripper, and a portion of the lean solvent can be re-introduced at the bottom (e.g., bubbled) of the stripper as vapor (e.g., using a reboiler). In such an embodiment, carbon dioxide can be recovered at the top of the stripper, and the lean solvent can be recovered at the bottom of the stripper. Generally, a reboiler for the stripper can be heated with steam (e.g., low pressure steam at a pressure of from about 400 kPa to about 1,500 kPa), wherein the steam can be recovered from the reboiler as an aqueous condensate, and wherein the recovered aqueous condensate can be further converted into the steam used for heating the reboiler. In some embodiments, the stripper can comprise a packed bed column, a tray column, a spray column, a falling film column, a bubble column, a sparged tank column, and the like, or combinations thereof. In an embodiment, the stripper can operate at a pressure of from about 5 psig to about 50 psig.

Stream 122 of hydrogen, carbon monoxide, water and methane exits steam methane reformer 120 and is then sent to a water-gas shift unit 125 to convert carbon monoxide and water into additional hydrogen and carbon dioxide according to the general reaction $CO+H_2O \leftrightarrow +H_2+CO_2$, also known as the water-gas shift (WGS) reaction. The WGS reaction can be conducted in the presence of a variety of catalysts at a WGS reaction temperature of from about 200° C. to about 500° C. In non-limiting illustrative embodiments, the WGS reaction can be divided into a high temperature process and a low temperature process. The high temperature process is generally carried out at temperatures within the range of between about 350° C. to about 400° C. The low temperature process WGS reaction is generally carried out at temperatures within the range of about 180° C. to about 240° C. While lower temperatures favor more complete carbon monoxide conversion, higher temperatures allow recovery of the heat of reaction at a sufficient temperature level to generate high pressure steam. For maximum efficiency and economy of operation, many plants contain a high temperature reaction unit for bulk carbon monoxide conversion and heat recovery and a low temperature reaction unit for final carbon monoxide conversion.

In illustrative embodiments, the water-gas shift unit 125 can comprise any suitable reactor such as, for example, a fixed bed reactor, adiabatic reactor, radial reactor, and the like, or combinations thereof. In an embodiment, a water-gas shift reactor can comprise a catalyst bed. In an embodiment, the water-gas shift unit 125 can be a multi-stage unit, for example, the water-gas shift unit 125 can comprise multiple reactors and/or multiple fixed beds.

The WGS reaction can be catalyzed by both metals and metal oxides. Suitable catalysts include, for example, cobalt, molybdenum, copper, iron, a cobalt-molybdenum catalyst, a chromium promoted iron-based catalyst, a copper promoted iron-based catalyst, a copper-zinc-aluminum catalyst, copper oxide (CuO), iron oxide ($Fe_2O_3$), oxides thereof, and the like, or combinations thereof.

Following the WGS reaction, stream 128 including at least hydrogen, carbon dioxide and methane exits water-gas shift unit 125 and enters pressure swing absorption unit 130 to remove hydrogen from stream 128 and sends stream 134 of hydrogen for storage or further processing and sends stream 132 including tail gas composed of carbon dioxide and methane to steam methane reformer 120 as discussed above. In general, pressure swing absorption processes involve carrying a gaseous mixture under pressure for a period of time over, for example, a first bed of a solid sorbent that is selective, or relatively selective, for one or more components, usually regarded as a contaminant, that is to be removed from the gaseous mixture. The components that are selectively adsorbed can be referred to as the heavy component, while the weakly adsorbed components that pass through the bed are referred to as the light components. Thus, the molecular species that do not selectively fill the micropores or open volume of the adsorbent are usually the "light" components.

Adsorbents for pressure swing absorption units are usually very porous materials chosen because of their large surface area. Typical adsorbents are activated carbons, silica gels, aluminas and zeolites. In some cases, a polymeric material can be used as the adsorbent material. Though the gas adsorbed on the interior surfaces of microporous materials may consist of a layer of only one, or at most a few molecules thick, surface areas of several hundred square meters per gram enable the adsorption of a significant portion of the adsorbent's weight in gas.

Different molecules can have different affinities for adsorption into the pore structure or open volume of the adsorbent. This provides one mechanism for the adsorbent to discriminate between different gases. In addition to their affinity for different gases, zeolites and some types of activated carbons, called carbon molecular sieves, may utilize their molecular sieve characteristics to exclude or slow the diffusion of some gas molecules into their structure. This provides a mechanism for selective adsorption based on the size of the molecules and usually restricts the ability of the larger molecules to be adsorbed. Either of these mechanisms can be employed to selectively fill the micropore structure of an adsorbent with one or more species from a multi-component gas mixture.

In the present case, hydrogen molecules are considered to be the contaminant. The pressure swing absorption unit can be operated to purify hydrogen at a pressure ranging from about 1 to about 500 psi, and is maintained at a temperature ranging from about 20 to about 90° C.

At step 16, in illustrative embodiments, the stream 136 of liquefied carbon dioxide then exits heat exchanger 110 and is transported to a facility where the liquefied carbon dioxide is stored for future use. In illustrative embodiments, the stream 136 of liquefied carbon dioxide exits heat exchanger 110 and is transported to a facility for sequestration. In illustrative embodiments, the stream 136 of liquefied carbon dioxide exits heat exchanger 110 and is used for enhanced oil recovery. For example, in an embodiment, the stream 136 of liquefied carbon dioxide exits heat exchanger 110 and is transported by a vehicle such as a truck or a railroad to an enhanced oil recovery site. In another embodiment, the stream 136 of liquefied carbon dioxide exits heat exchanger 110 and is transported by a ship to an overseas site.

Figure 3:
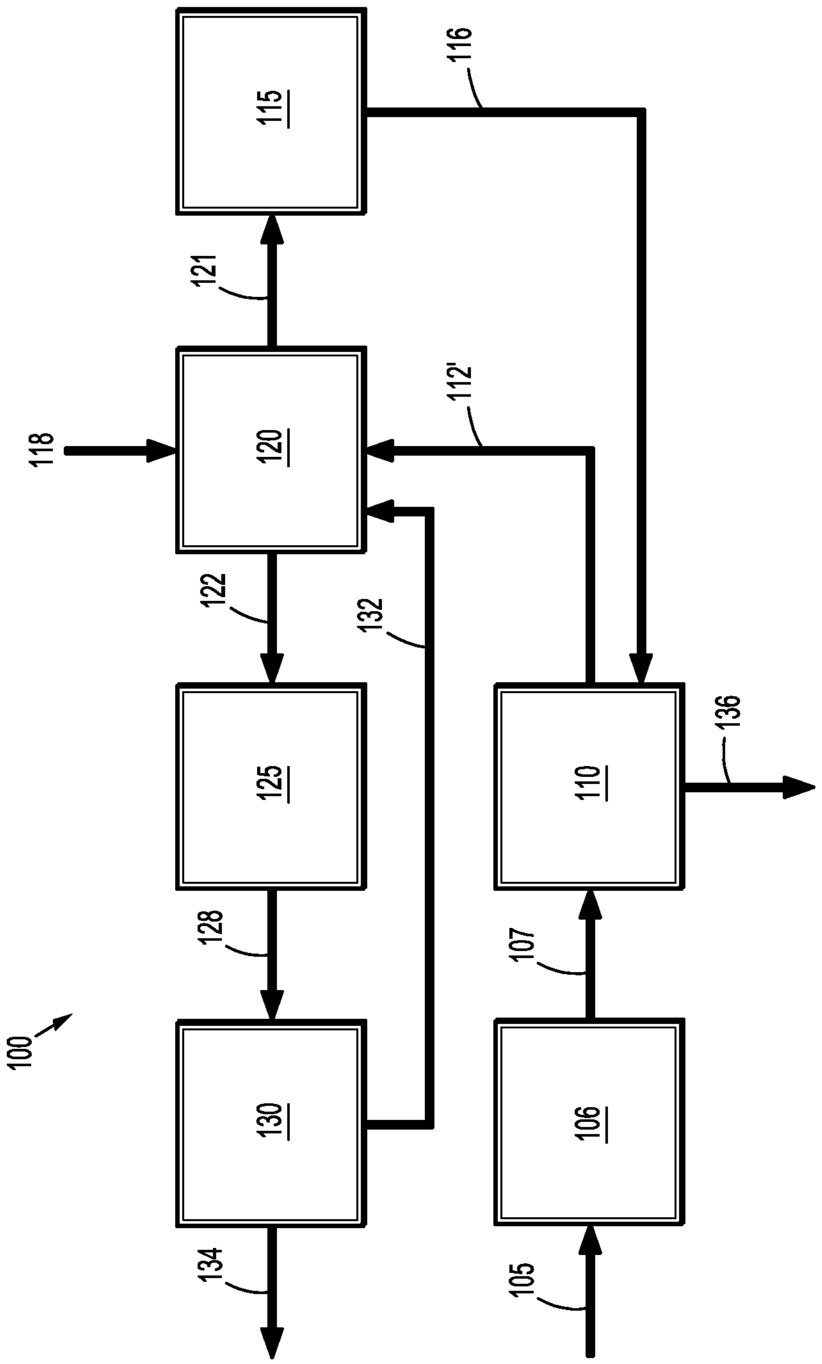
FIG. 3 illustrates a process and system for converting carbon dioxide gas to liquefied carbon dioxide utilizing liquefied natural gas, according to an alternative illustrative embodiment.

In an illustrative embodiment, as may be combined with one or more of the preceding paragraphs, system 100 can further include pump 106 for first receiving stream 105 of liquefied natural gas as depicted in FIG. 3. In general, the liquefied natural gas coming from, for example, a seafaring ship, is at a pressure of about 1 to about 10 bar. In an illustrative embodiment, the pump 106 can be employed to increase the pressure of the stream 105 of liquefied natural gas to generate a stream 107 of pressurized liquefied natural gas for use in the process of the illustrative embodiments described herein. For example, stream 105 of liquefied natural gas can be pumped in pump 106 to a pressure of about 10 bar to about 100 bar. In an illustrative embodiment, stream 105 of liquefied natural gas can be pumped in pump 106 to a pressure of about 20 bar to about 35 bar. The stream 107 of pressurized liquefied natural gas is usually at a temperature of about −50 to about −200° C.

The stream 107 of pressurized liquefied natural gas is then sent to heat exchanger 110 for converting the stream 116 of carbon dioxide gas to stream 136 of liquefied carbon dioxide as discussed above. In particular, not only is the stream 107 of pressurized liquefied natural gas at a sufficiently low temperature and having a sufficient refrigeration capacity to pre-cool the stream 116 of carbon dioxide gas, but also the heat of the stream 116 of carbon dioxide gas by indirect heat exchange converts the stream 107 of pressurized liquefied natural gas to stream 112' of pressurized natural gas for further processing as discussed herein. For example, the stream 107 of pressurized liquefied natural gas is heated in heat exchanger 110 from the temperature of the stream 116 of carbon dioxide gas which exchanges temperatures with the stream 107 of pressurized liquefied natural gas in the heat exchanger 110 to convert the stream 107 of pressurized liquefied natural gas to stream 112' of pressurized natural gas. The stream 112' of pressurized natural gas exits heat exchanger 110 and is sent to steam methane reformer 120 for further processing. The stream 136 of liquefied carbon dioxide then exits heat exchanger 110 and is transported to a facility where the liquefied carbon dioxide is stored.

A steam methane reformer 120 may convert methane from stream 112' of pressurized natural gas to hydrogen by reacting steam from stream 118 with stream 112' of pressurized natural gas to generate a stream 122 of hydrogen, carbon monoxide, water and methane. In an illustrative embodiment, the stream 112' of pressurized natural gas will be at a pressure of about 10 bar to about 100 bar. In an illustrative embodiment, the stream 112' of pressurized natural gas will be at a pressure of about 20 bar to about 35 bar. The reaction can be carried out at a temperature ranging from about 600 to about 1000° C. and for a sufficient time period.

As discussed above, in embodiments, the fuel for combusting in the steam methane reformer 120 to generate heat can be the tail gas received from the pressure swing absorption unit 130 via stream 132, as discussed above. When embodied as the tail gas from the pressure swing absorption unit 130, the steam methane reformer fuel can include at least carbon dioxide and methane. In additional or alternative aspects, the stream 132 of the pressure swing absorption unit 130 is the only fuel stream that is fed to the steam methane reformer 120 during steady state operation. In an embodiment, a combusted tail gas stream 121 including carbon dioxide is emitted from steam methane reformer 120 to absorption unit 115 for capturing the carbon dioxide.

In non-limiting illustrative embodiments, system 100 further includes absorption unit 115 to process the combusted tail gas stream 121 as discussed above. Stream 116 of carbon dioxide gas exits absorption unit 115 and is supplied to the heat exchanger 110 having a temperature ranging from about 5° C. to about 100° C. and a pressure of about 1 to about 30 bar for further processing as discussed above.

Stream 122 of hydrogen, carbon monoxide, water and methane exits steam methane reformer 120 and is then sent to water-gas shift unit 125 to convert carbon monoxide and water into additional hydrogen and carbon dioxide as discussed above.

Following the WGS reaction, stream 128 including at least hydrogen, carbon dioxide and methane exits water-gas shift unit 125 and enters pressure swing absorption unit 130 to remove hydrogen from stream 128 and sends stream 134 of hydrogen for storage or further processing and sends stream 132 including tail gas composed of carbon dioxide and methane to steam methane reformer 120 as discussed above.

Figure 4:
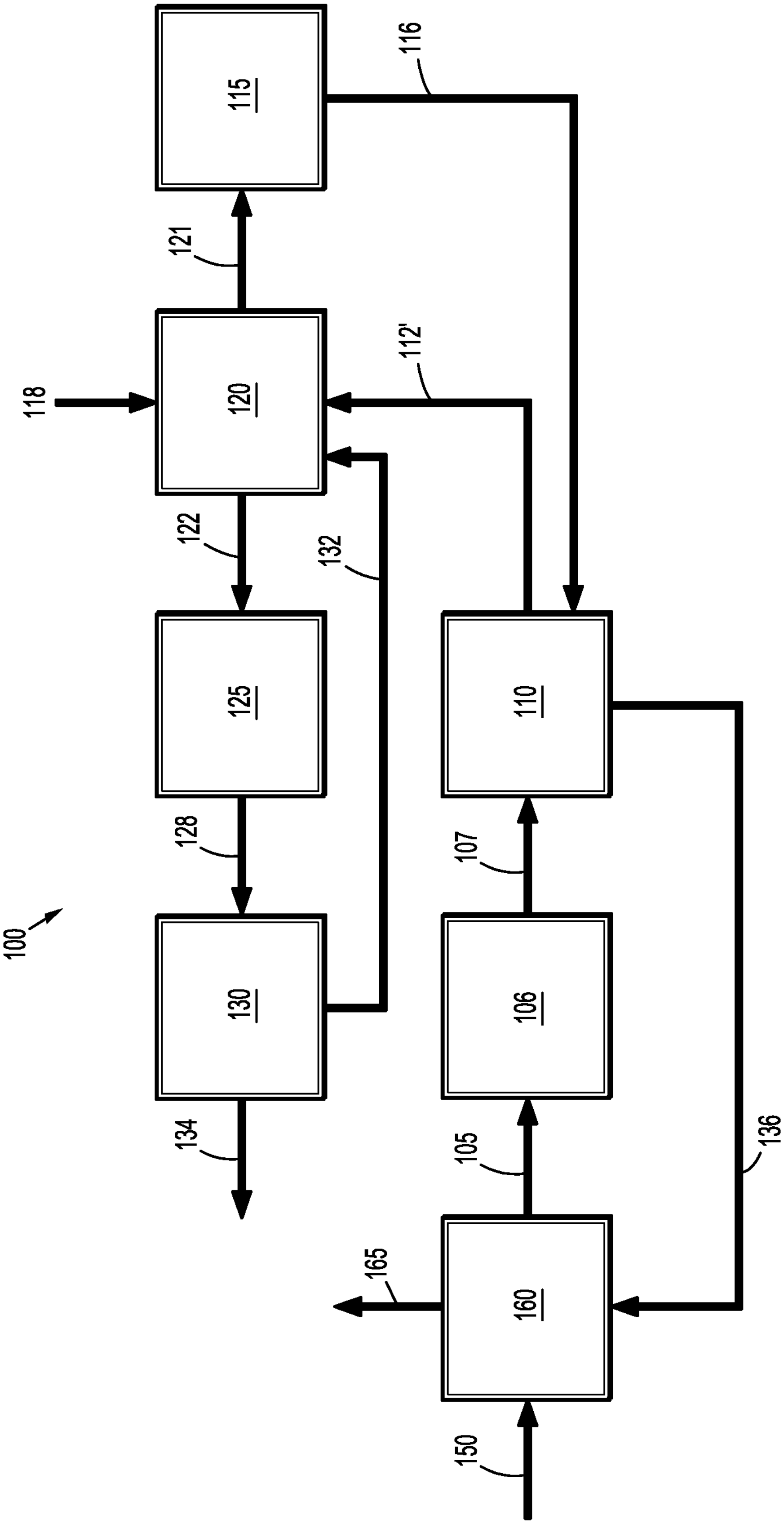
FIG. 4 illustrates a process and system for converting carbon dioxide gas to liquefied carbon dioxide utilizing liquefied natural gas, according to another alternative illustrative embodiment.

In another illustrative embodiment, as may be combined with one or more of the preceding paragraphs, system 100 can further include natural gas liquefication plant 160 for generating stream 105 of liquefied natural gas from stream 150 of natural gas as depicted in FIG. 4. As mentioned above, a liquefied natural gas production facility receives raw feed gas, such as natural gas, from a pipeline (e.g., a natural gas pipeline) where it is then subjected to known processing conditions to convert natural gas to liquefied natural gas. Accordingly, in the illustrative embodiment of FIG. 4, natural gas liquefication plant 160 receives a stream 150 of natural gas from, for example, a pipeline, where it is then subjected to known processing conditions to convert stream 150 of natural gas to stream 105 of liquefied natural gas.

Natural gas liquefication plant 160 also receives a stream 136 of liquefied carbon dioxide from heat exchanger 110 where it is evaporated by natural gas and provides cooling or pre-cooling to natural gas in a liquefaction process. The cooled or pre-cooled natural gas may then be further converted to liquefied natural gas and transported by ship to a remote terminal for use in steam methane reforming, and exits as stream 165 of carbon dioxide in the form of gaseous $CO_2$.

Next, stream 105 of liquefied natural gas is sent to pump 106 to increase the pressure of the stream 105 of liquefied natural gas and generate a stream 107 of pressurized liquefied natural gas as discussed above. The stream 107 of pressurized liquefied natural gas is then sent to heat exchanger 110 for converting the stream 116 of carbon dioxide gas to stream 136 of liquefied carbon dioxide as also discussed above. For example, the stream 107 of pressurized liquefied natural gas is heated in heat exchanger 110 from the temperature of the stream 116 of carbon dioxide gas which exchanges temperatures with the stream 107 of pressurized liquefied natural gas in the heat exchanger 110 to convert the stream 107 of pressurized liquefied natural gas to stream 112' of pressurized natural gas. The stream 112' of pressurized natural gas exits heat exchanger 110 and is sent to steam methane reformer 120 for further processing. The stream 136 of liquefied carbon dioxide then exits heat exchanger 110 and is transported to a facility where the liquefied carbon dioxide is stored.

Steam methane reformer 120 may convert methane from stream 112' of pressurized natural gas to hydrogen by reacting steam from stream 118 with stream 112' of pressurized natural gas to generate a stream 122 of hydrogen, carbon monoxide, water and methane. In an illustrative embodiment, the stream 112' of pressurized natural gas will be at a pressure of about 10 bar to about 100 bar. In an illustrative embodiment, the stream 112' of pressurized natural gas will be at a pressure of about 20 bar to about 35 bar. The reaction can be carried out at a temperature ranging from about 600 to about 1000° C. and for a sufficient time period.

As discussed above, in embodiments, the fuel for combusting in the steam methane reformer 120 to generate heat can be the tail gas received from the pressure swing absorption unit 130 via stream 132, as discussed above. When embodied as the tail gas from the pressure swing absorption unit 130, the steam methane reformer fuel can include at least carbon dioxide and methane. In additional or alternative aspects, the stream 132 of the pressure swing absorption unit 130 is the only fuel stream that is fed to the steam methane reformer 120 during steady state operation. In an embodiment, a combusted tail gas stream 121 including carbon dioxide is emitted from steam methane reformer 120 to absorption unit 115 for capturing the carbon dioxide.

In non-limiting illustrative embodiments, system 100 further includes absorption unit 115 to process the combusted tail gas stream 121 as discussed above. Stream 116 of carbon dioxide gas exits absorption unit 115 and is supplied to the heat exchanger 110 having a temperature ranging from about 5° C. to about 100° C. and a pressure of about 1 to about 30 bar for further processing as discussed above.

Stream 122 of hydrogen, carbon monoxide, water and methane exits steam methane reformer 120 and is then sent to water-gas shift unit 125 to convert carbon monoxide and water into additional hydrogen and carbon dioxide as discussed above.

Following the WGS reaction, stream 128 including at least hydrogen, carbon dioxide and methane exits water-gas shift unit 125 and enters pressure swing absorption unit 130 to remove hydrogen from stream 128 and sends stream 134 of hydrogen for storage or further processing and sends stream 132 including tail gas composed of carbon dioxide and methane to steam methane reformer 120 as discussed above.

Figure 5:
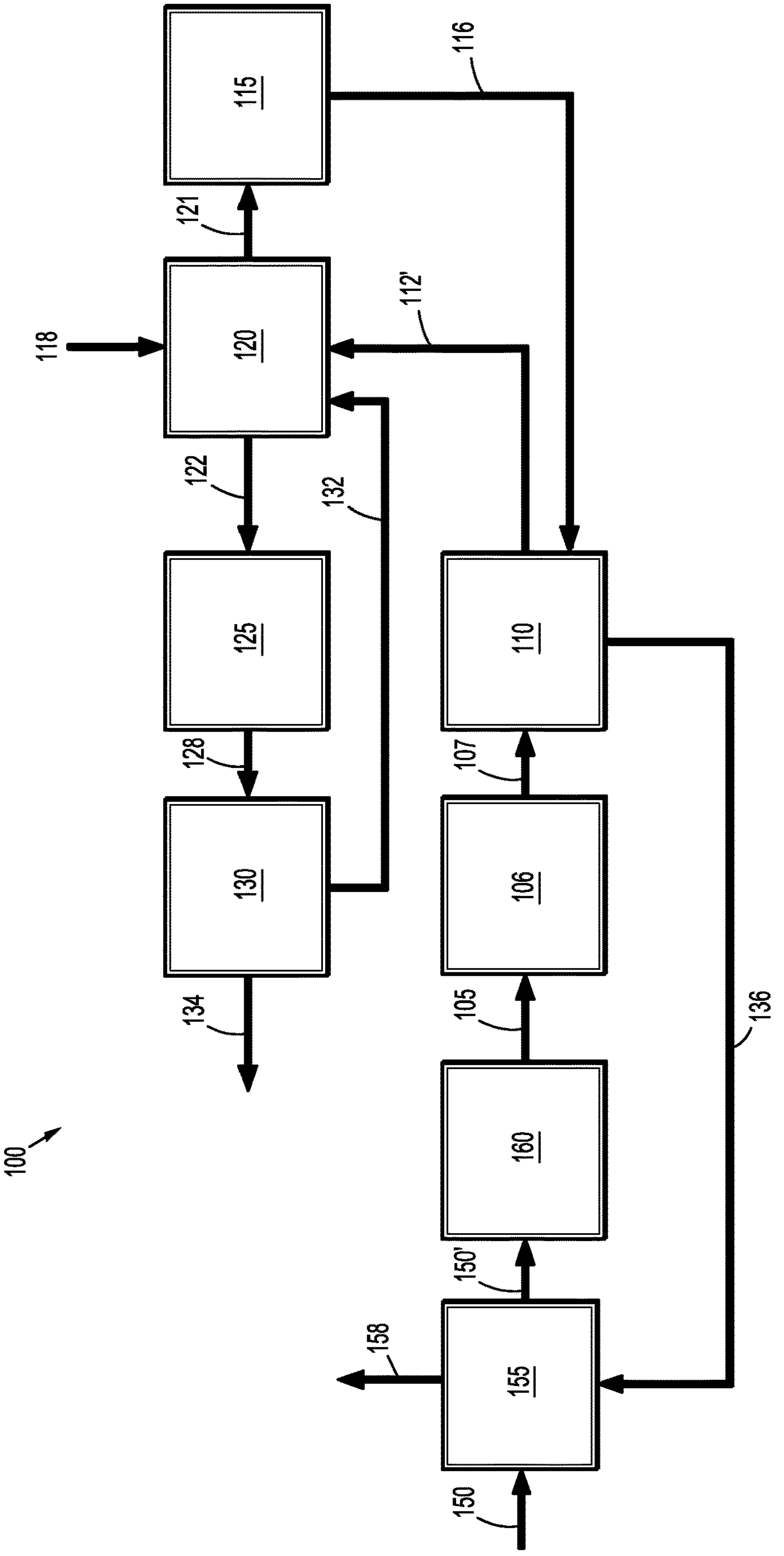
FIG. 5 illustrates a process and system for converting carbon dioxide gas to liquefied carbon dioxide utilizing liquefied natural gas, according to yet another alternative illustrative embodiment.

In another illustrative embodiment, as may be combined with one or more of the preceding paragraphs, system 100 can further include pre-cooler unit 155 for receiving a stream 150 of natural gas where it is subjected to pre-cooling conditions to further cool the stream 150 of natural gas and generate stream 150' of cooled natural gas as depicted in FIG. 5. In an illustrative embodiment, stream 150 of natural gas is cooled to a temperature ranging from about −50 to about −200° C. Pre-cooler unit 155 also receives a stream 136 of liquefied carbon dioxide from heat exchanger 110 where it is heated and evaporated and exits as stream 158 of gaseous carbon dioxide.

Natural gas liquefication plant 160 receives stream 150' of cooled natural gas for generating stream 105 of liquefied natural gas using known processing conditions to convert natural gas to liquefied natural gas. Next, stream 105 of liquefied natural gas is sent to pump 106 to increase the pressure of the stream 105 of liquefied natural gas and generate a stream 107 of pressurized liquefied natural gas as discussed above. The stream 107 of pressurized liquefied natural gas is then sent to heat exchanger 110 for converting the stream 116 of carbon dioxide gas to stream 136 of liquefied carbon dioxide as also discussed above. For example, the stream 107 of pressurized liquefied natural gas is heated in heat exchanger 110 from the temperature of the stream 116 of carbon dioxide gas which exchanges temperatures with the stream 107 of pressurized liquefied natural gas in the heat exchanger 110 to convert the stream 107 of pressurized liquefied natural gas to stream 112' of pressurized natural gas. The stream 112' of pressurized natural gas exits heat exchanger 110 and is sent to steam methane reformer 120 for further processing. The stream 136 of liquefied carbon dioxide then exits heat exchanger 110 and is transported back to pre-cooler unit 155 as discussed above.

Steam methane reformer 120 may convert methane from stream 112' of pressurized natural gas to hydrogen by reacting steam from stream 118 with stream 112' of pressurized natural gas to generate a stream 122 of hydrogen, carbon monoxide, water and methane. In an illustrative embodiment, the stream 112' of pressurized natural gas will be at a pressure of about 10 bar to about 100 bar. In an illustrative embodiment, the stream 112' of pressurized natural gas will be at a pressure of about 20 bar to about 35 bar. The reaction can be carried out at a temperature ranging from about 600 to about 1000° C. and for a sufficient time period.

As discussed above, in embodiments, the fuel for combusting in the steam methane reformer 120 to generate heat can be the tail gas received from the pressure swing absorption unit 130 via stream 132, as discussed above. When embodied as the tail gas from the pressure swing absorption unit 130, the steam methane reformer fuel can include at least carbon dioxide and methane. In additional or alternative aspects, the stream 132 of the pressure swing absorption unit 130 is the only fuel stream that is fed to the steam methane reformer 120 during steady state operation. In an embodiment, a combusted tail gas stream 121 including carbon dioxide is emitted from steam methane reformer 120 to absorption unit 115 for capturing the carbon dioxide.

In non-limiting illustrative embodiments, system 100 further includes absorption unit 115 to process the combusted tail gas stream 121 as discussed above. Stream 116 of carbon dioxide gas exits absorption unit 115 and is supplied to the heat exchanger 110 having a temperature ranging from about 5° C. to about 100° C. and a pressure of about 1 to about 30 bar for further processing as discussed above.

Stream 122 of hydrogen, carbon monoxide, water and methane exits steam methane reformer 120 and is then sent to water-gas shift unit 125 to convert carbon monoxide and water into additional hydrogen and carbon dioxide as discussed above.

Following the WGS reaction, stream 128 including at least hydrogen, carbon dioxide and methane exits water-gas shift unit 125 and enters pressure swing absorption unit 130 to remove hydrogen from stream 128 and sends stream 134 of hydrogen for storage or further processing and sends stream 132 including tail gas composed of carbon dioxide and methane to steam methane reformer 120 as discussed above.

In some implementations, such as those depicted in FIGS. 2-5, steam methane reformer 120 can further produce flue gas (not shown), which comes from the furnaces that are used to heat the reactor tubes and generate steam for the reaction. The flue gas has a relatively lower concentration of carbon dioxide (e.g., only about 3 to about 5% $CO_2$ concentration).

According to an aspect of the present disclosure, a method for converting carbon dioxide gas to liquefied carbon dioxide comprises:

(a) receiving, in a heat exchanger, a carbon dioxide gas stream and a liquefied natural gas stream; and (b) exposing the carbon dioxide gas stream to the liquefied natural gas stream to convert the carbon dioxide gas stream to liquefied carbon dioxide.

In one or more additional illustrative embodiments, as may be combined with the preceding paragraphs, the carbon dioxide gas stream has a first temperature and the liquefied natural gas stream has a second temperature less than the first temperature.

In one or more additional illustrative embodiments, as may be combined with the preceding paragraphs, the carbon dioxide gas stream is at room temperature and the liquefied natural gas stream has a temperature of about −50° C. to about −200° C.

In one or more additional illustrative embodiments, as may be combined with the preceding paragraphs, the liquefied carbon dioxide is sent to a storage facility.

In one or more additional illustrative embodiments, as may be combined with the preceding paragraphs, where exposing the carbon dioxide gas stream to the liquefied natural gas stream regasifies the liquefied natural gas stream to natural gas.

In one or more additional illustrative embodiments, as may be combined with the preceding paragraphs, the method further comprises introducing the natural gas to a steam methane reformer to generate a first stream comprising hydrogen, carbon monoxide and methane and a second stream comprising carbon dioxide.

In one or more additional illustrative embodiments, as may be combined with the preceding paragraphs, the method further comprises introducing the first stream comprising hydrogen, carbon monoxide and methane to a water-gas shift unit to produce a third stream comprising hydrogen, carbon dioxide and methane.

In one or more additional illustrative embodiments, as may be combined with the preceding paragraphs, the method further comprises introducing the third stream comprising hydrogen, carbon dioxide and methane to a pressure swing absorption to separate the hydrogen from the carbon dioxide and methane.

In one or more additional illustrative embodiments, as may be combined with the preceding paragraphs, the method further comprises introducing the second stream comprising carbon dioxide to an absorption unit to produce another carbon dioxide gas stream to send to the heat exchanger for exposing to the liquefied natural gas stream.

According to another aspect of the present disclosure, a method for converting carbon dioxide gas to liquefied carbon dioxide comprises:

(a) introducing a liquefied natural gas stream to a pump to generate a pressurized liquefied natural gas stream;

(b) introducing a carbon dioxide gas stream and the pressurized liquefied natural gas stream to a heat exchanger; and (c) exposing the carbon dioxide gas stream to the pressurized liquefied natural gas stream to convert the carbon dioxide gas stream to liquefied carbon dioxide.

In one or more additional illustrative embodiments, as may be combined with the preceding paragraphs, the pressurized liquefied natural gas stream has a pressure of about 10 bar to about 100 bar.

In one or more additional illustrative embodiments, as may be combined with the preceding paragraphs, the carbon dioxide gas stream is at room temperature and the liquefied natural gas stream has a temperature of about −50° C. to about −200° C.

In one or more additional illustrative embodiments, as may be combined with the preceding paragraphs, where exposing the carbon dioxide gas stream to the pressurized liquefied natural gas stream regasifies the pressurized liquefied natural gas stream to pressurized natural gas.

In one or more additional illustrative embodiments, as may be combined with the preceding paragraphs, the method further comprises introducing the pressurized natural gas to a steam methane reformer to generate a first stream comprising hydrogen, carbon monoxide and methane and a second stream comprising carbon dioxide.

In one or more additional illustrative embodiments, as may be combined with the preceding paragraphs, the method further comprises introducing the first stream comprising hydrogen, carbon monoxide and methane to a water-gas shift unit to produce a third stream comprising hydrogen, carbon dioxide and methane.

In one or more additional illustrative embodiments, as may be combined with the preceding paragraphs, the method further comprises introducing the third stream comprising hydrogen, carbon dioxide and methane to a pressure swing absorption to separate the hydrogen from the carbon dioxide and methane and produce a tail gas comprising the carbon dioxide and methane.

In one or more additional illustrative embodiments, as may be combined with the preceding paragraphs, the method further comprises introducing the second stream comprising carbon dioxide to an absorption unit to produce another carbon dioxide gas stream to send to the heat exchanger for exposing to the liquefied natural gas stream.

According to another aspect of the present disclosure, a system, comprises:

a heat exchanger configured to cool carbon dioxide gas with liquefied natural gas and convert the carbon dioxide gas to liquefied carbon dioxide and regasify the liquefied natural gas to natural gas.

In one or more additional illustrative embodiments, as may be combined with the preceding paragraphs, the carbon dioxide gas is at room temperature and the liquefied natural gas has a temperature of about −50° C. to about −200° C.

In one or more additional illustrative embodiments, as may be combined with the preceding paragraphs, the system further comprises one or more of:

a steam methane reformer configured to receive the natural gas and generate a first stream comprising hydrogen, carbon monoxide and methane and a second stream comprising carbon dioxide;

a water-gas shift unit configured to receive the first stream comprising hydrogen, carbon monoxide and methane to produce a third stream comprising hydrogen, carbon dioxide and methane;

a pressure swing absorption configured to receive the third stream comprising hydrogen, carbon dioxide and methane to separate the hydrogen from the carbon dioxide and methane and produce a tail gas comprising the carbon dioxide and methane; and an absorption unit configured to receive the second stream comprising carbon dioxide to produce another carbon dioxide gas stream to send to the heat exchanger for exposing to the liquefied natural gas.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present compositions and are disclosed herein just as if each and every such sub-combination was individually and explicitly disclosed herein.

It will be understood that various modifications may be made to the embodiments disclosed herein. Therefore, the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A method for converting carbon dioxide gas to liquefied carbon dioxide comprising:

(a) receiving, in a heat exchanger, a first carbon dioxide gas stream and a liquefied natural gas stream;

(b) exposing the first carbon dioxide gas stream to the liquefied natural gas stream to convert the first carbon dioxide gas stream to liquefied carbon dioxide, wherein exposing the first carbon dioxide gas stream to the liquefied natural gas stream regasifies the liquefied natural gas stream to natural gas;

(c) introducing the natural gas to a steam methane reformer to generate a first stream comprising hydrogen, carbon monoxide and methane and a second stream comprising carbon dioxide;

(d) introducing the second stream comprising carbon dioxide to an absorption unit to produce a second carbon dioxide gas stream; and (e) sending the second carbon dioxide gas stream to the heat exchanger with the first carbon dioxide gas stream and the liquefied natural gas stream for converting the first carbon dioxide gas stream and the second carbon dioxide gas stream to the liquefied carbon dioxide.

2. The method according to claim 1, wherein the first carbon dioxide gas stream has a first temperature and the liquefied natural gas stream has a second temperature less than the first temperature.

3. The method according to claim 1, wherein the first carbon dioxide gas stream is at room temperature and the liquefied natural gas stream has a temperature of about −50° C. to about −200° C.

4. The method according to claim 1, wherein the liquefied carbon dioxide stream is sent to a storage facility.

5. The method according to claim 1, further comprising introducing the first stream comprising hydrogen, carbon monoxide and methane to a water-gas shift unit to produce a third stream comprising hydrogen, carbon dioxide and methane.

6. The method according to claim 5, further comprising introducing the third stream comprising hydrogen, carbon dioxide and methane to a pressure swing absorption to separate the hydrogen from the carbon dioxide and methane.

7. The method according to claim 1, wherein the introducing the second stream comprising carbon dioxide to an absorption unit to produce a second carbon dioxide gas stream comprises:

removing at least a portion of the carbon dioxide in the second stream by an absorption solvent in an absorber of the absorption unit, thereby generating a liquefied carbon dioxide stream comprising carbon dioxide and the absorption solvent; and processing the liquefied carbon dioxide stream in a regenerator, thereby generating a solvent stream and the second carbon dioxide gas stream.

8. The method according to claim 7, wherein the absorption solvent is a physical solvent, and the regenerator is a flash tank or flash column configured to remove the carbon dioxide from the liquefied carbon dioxide stream by pressure reduction.

9. The method according to claim 7, wherein the absorption solvent is a chemical solvent, and the regenerator is a stripper configured to use a stripping gas to remove the carbon dioxide from the chemical solvent.

10. The method according to claim 9, wherein the stripper comprises a reboiler to provide heat to the stripper for removing the carbon dioxide from the chemical solvent, thereby generating the solvent stream and the second carbon dioxide gas stream.

11. The method according to claim 10, wherein the reboiler is heated with steam and the steam is recovered from the reboiler as an aqueous condensate, and wherein the recovered aqueous condensate is converted into the steam used for heating the reboiler.

12. A method for converting carbon dioxide gas to liquefied carbon dioxide comprising:

(a) introducing a liquefied natural gas stream to a pump to generate a pressurized liquefied natural gas stream;

(b) introducing a first carbon dioxide gas stream and the pressurized liquefied natural gas stream to a heat exchanger;

(c) exposing the first carbon dioxide gas stream to the pressurized liquefied natural gas stream to convert the carbon dioxide gas stream to liquefied carbon dioxide, wherein exposing the first carbon dioxide gas stream to the pressurized liquefied natural gas stream regasifies the pressurized liquefied natural gas stream to pressurized natural gas;

(d) introducing the pressurized natural gas to a steam methane reformer to generate a first stream comprising hydrogen, carbon monoxide and methane and a second stream comprising carbon dioxide;

(e) introducing the second stream comprising carbon dioxide to an absorption unit to produce another carbon dioxide gas stream to send to the heat exchanger for exposing to the liquefied natural gas stream; and (f) sending the second carbon dioxide gas stream to the heat exchanger with the first carbon dioxide gas stream and the liquefied natural gas stream for converting the first carbon dioxide gas stream and the second carbon dioxide gas stream to the liquefied carbon dioxide.

13. The method according to claim 12, wherein the pressurized liquefied natural gas stream has a pressure of about 10 bar to about 100 bar.

14. The method according to claim 12, wherein the first carbon dioxide gas stream is at room temperature and the liquefied natural gas stream has a temperature of about −50° C. to about −200° C.

15. The method according to claim 12, further comprising introducing the first stream comprising hydrogen, carbon monoxide and methane to a water-gas shift unit to produce a third stream comprising hydrogen, carbon dioxide and methane.

16. The method according to claim 15, further comprising introducing the third stream comprising hydrogen, carbon dioxide and methane to a pressure swing absorption to separate the hydrogen from the carbon dioxide and methane and produce a tail gas comprising the carbon dioxide and methane.

17. The method according to claim 12, wherein the introducing the second stream comprising carbon dioxide to an absorption unit to produce a second carbon dioxide gas stream comprises:

removing at least a portion of the carbon dioxide in the second stream by an absorption solvent in an absorber of the absorption unit, thereby generating a liquefied carbon dioxide stream comprising carbon dioxide and the absorption solvent; and processing the liquefied carbon dioxide stream in a regenerator, thereby generating a solvent stream and the second carbon dioxide gas stream.

18. The method according to claim 17, wherein the absorption solvent is a physical solvent, and the regenerator is a flash tank or flash column configured to remove the carbon dioxide from the liquefied carbon dioxide stream by pressure reduction.

19. The method according to claim 17, wherein the absorption solvent is a chemical solvent, and the regenerator is a stripper configured to use a stripping gas to remove the carbon dioxide from the chemical solvent.

20. The method according to claim 19, wherein the stripper comprises a reboiler to provide heat to the stripper for removing the carbon dioxide from the chemical solvent, thereby generating the solvent stream and the second carbon dioxide gas stream.

21. The method according to claim 20, wherein the reboiler is heated with steam and the steam is recovered from the reboiler as an aqueous condensate, and wherein the recovered aqueous condensate is converted into the steam used for heating the reboiler.

* * * * *